(12) United States Patent
Suzuki et al.

(10) Patent No.: US 10,294,428 B2
(45) Date of Patent: May 21, 2019

(54) COMPOSITION FOR REMOVING SULFUR-CONTAINING COMPOUNDS

(71) Applicant: KURARAY CO., LTD., Kurashiki-shi (JP)

(72) Inventors: Takahiro Suzuki, Kurashiki (JP); Yuusuke Saitou, Kamisu (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 15/546,091

(22) PCT Filed: Jan. 26, 2016

(86) PCT No.: PCT/JP2016/052157
§ 371 (c)(1),
(2) Date: Jul. 25, 2017

(87) PCT Pub. No.: WO2016/121747
PCT Pub. Date: Aug. 4, 2016

(65) Prior Publication Data
US 2018/0010056 A1    Jan. 11, 2018

(30) Foreign Application Priority Data

Jan. 29, 2015 (JP) ................... 2015-015380

(51) Int. Cl.
*C10G 29/22* (2006.01)
*B01J 20/26* (2006.01)
(Continued)

(52) U.S. Cl.
CPC .......... *C10G 29/22* (2013.01); *B01D 53/14* (2013.01); *B01J 20/26* (2013.01); *C10G 29/02* (2013.01); *C10L 3/10* (2013.01)

(58) Field of Classification Search
CPC .................. C10G 29/22; C10G 29/24
(Continued)

(56) References Cited

U.S. PATENT DOCUMENTS 1,991,765 A    2/1935 Marks
4,510,332 A *  4/1985 Matsumoto ........... C07C 43/317
                                                568/454
(Continued)

FOREIGN PATENT DOCUMENTS

JP    10-235130 A    9/1998
JP    2004-168663 A  6/2004
(Continued)

OTHER PUBLICATIONS

International Search Report dated Mar. 1, 2016, in PCT/JP2016/052157, filed Jan. 26, 2016.
(Continued)

*Primary Examiner* — Ellen M McAvoy
(74) *Attorney, Agent, or Firm* — Oblon, McClelland, Maier & Neustadt, L.L.P.

(57) ABSTRACT

Provided is a composition capable of safely and efficiently removing a sulfur-containing compound, especially hydrogen sulfide, an —SH group-containing compound or a mixture thereof contained in a hydrocarbon, and not causing metal corrosion in devices. The composition is for removing a sulfur-containing compound in a hydrocarbon, wherein the sulfur-containing compound is hydrogen sulfide, an —SH group-containing compound or a mixture thereof, and the composition contains a dialdehyde having 6 to 16 carbon atoms and a polyalkylene glycol.

13 Claims, 1 Drawing Sheet

(51) Int. Cl.
*B01D 53/14* (2006.01)
*C10G 29/02* (2006.01)
*C10L 3/10* (2006.01)

(58) Field of Classification Search
USPC .................................................. 208/237, 240
See application file for complete search history.

(56) References Cited

U.S. PATENT DOCUMENTS

| | | | |
|---|---|---|---|
| 4,532,117 A * | 7/1985 | Delaney | B01D 53/1425 |
| | | | 210/764 |
| 4,680,127 A | 7/1987 | Edmondson | |
| 5,284,635 A | 2/1994 | Mabire | |
| 5,347,004 A * | 9/1994 | Rivers | B01D 53/52 |
| | | | 544/180 |
| 5,462,721 A * | 10/1995 | Pounds | B01D 53/1468 |
| | | | 208/207 |
| 5,688,478 A * | 11/1997 | Pounds | B01D 53/1493 |
| | | | 423/228 |
| 9,260,669 B2 * | 2/2016 | Ramachandran | C10G 19/02 |
| 9,463,989 B2 * | 10/2016 | Menendez | C02F 1/683 |
| 9,587,181 B2 * | 3/2017 | Lehrer | C10G 29/06 |
| 9,638,018 B2 * | 5/2017 | Martinez | E21B 43/34 |
| 2002/0157989 A1 * | 10/2002 | Gatlin | C02F 1/58 |
| | | | 208/226 |
| 2011/0147272 A1 | 6/2011 | Karas et al. | |
| 2012/0241361 A1 | 9/2012 | Ramachandran et al. | |
| 2013/0004393 A1 | 1/2013 | Menendez et al. | |
| 2013/0089460 A1 | 4/2013 | Keenan et al. | |
| 2013/0090271 A1 | 4/2013 | Keenan et al. | |
| 2013/0240409 A1 | 9/2013 | Subramaniyam | |
| 2015/0001132 A1 | 1/2015 | Sorrells et al. | |
| 2017/0081597 A1 * | 3/2017 | Fuji | C10L 3/103 |

FOREIGN PATENT DOCUMENTS

| | | |
|---|---|---|
| JP | 2012-525964 | 10/2012 |
| JP | 2013-515818 A | 5/2013 |
| JP | 2013-544305 A | 12/2013 |
| WO | 2011/087540 A2 | 7/2011 |

OTHER PUBLICATIONS

Horaska et al., "Acrolein Provides Benefits and Solutions to Offshore Oilfield-Production Problems", Oil and Gas Facilities, Aug. 2012.pp. 47-54.

Extended European Search Report dated Jun. 21, 2018 in European Patent Application No. 16743350.7, citing document AA therein, 5 pages.

* cited by examiner

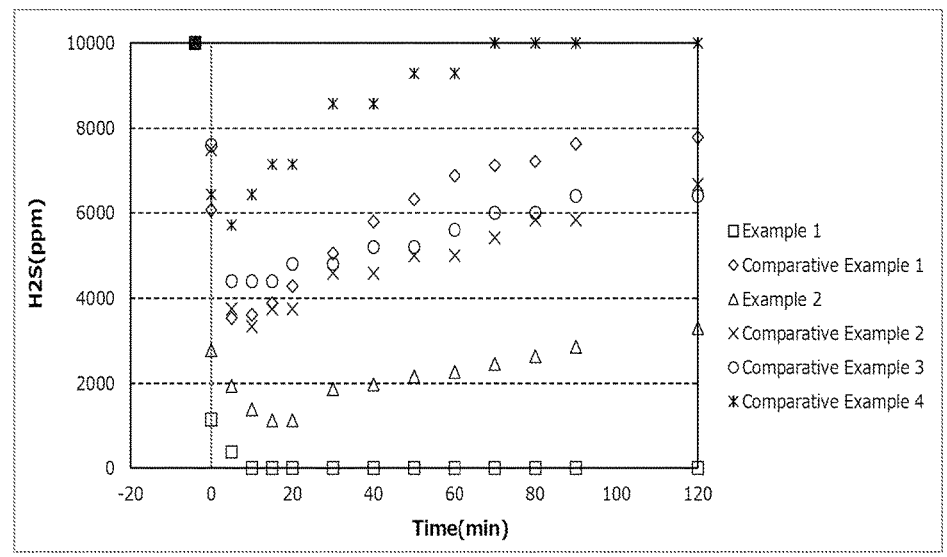

COMPOSITION FOR REMOVING SULFUR-CONTAINING COMPOUNDS

TECHNICAL FIELD

The present invention relates to a composition for removing a sulfur-containing compound, typically hydrogen sulfide, an —SH group-containing compound or a mixture thereof in a hydrocarbon, or for reducing the concentration of the compound. Precisely, for example, the present invention relates to a composition for removing a sulfur-containing compound (typically hydrogen sulfide) contained in fossil fuel, purified petroleum products and the like such as natural gas, liquefied natural gas, sour gas, crude oil, naphtha, heavy aromatic naphtha, gasoline, kerosene, diesel oil, gas oil, heavy oil, FCC slurry, asphalt, oilfield condensate, etc., and to a method for removing a sulfur-containing compound (typically hydrogen sulfide) using the composition.

BACKGROUND ART

Hydrocarbon in fossil fuel, purified petroleum products and the like such as natural gas, liquefied natural gas, sour gas, crude oil, naphtha, heavy aromatic naphtha, gasoline, kerosene, diesel oil, gas oil, heavy oil, FCC slurry, asphalt, oilfield condensate, etc. often contains sulfur-containing compounds such as hydrogen sulfide and various —SH group-containing compounds (typically various mercaptans). The toxicity of hydrogen sulfide is well known, and in the industry that deals with fossil fuel and purified petroleum products, considerable costs and efforts are paid for reducing the content of hydrogen sulfide to a safe level. For example, for pipeline gas, a hydrogen sulfide content of not more than 4 ppm is required as an ordinary regulatory value. Hydrogen sulfide and various —SH group-containing compounds (typically various mercaptans) are volatile and therefore tend to emit in a vapor space, and in such a case, an offensive odor thereof is often problematic in the storage site and/or in the site around it and through the pipeline for use for transporting the hydrocarbon and the shipping system.

From the above-mentioned viewpoint, in a large-scale equipment that deals with fossil fuel or purified petroleum products, in general a system for treating hydrocarbon or hydrocarbon flow containing hydrogen sulfide is arranged. The system is equipped with an absorption tower filled with an alkanolamine, a polyethylene glycol, a hindered amine or the like to be kept in contact with hydrocarbon or hydrocarbon flow to absorb sulfur-containing compounds such as hydrogen sulfide and various —SH group-containing compounds (typically various mercaptans) and, as the case may be, carbon dioxide and the like.

On the other hand, use of a triazine for removing hydrogen sulfide from hydrocarbon has been known through the ages, but a triazine is defective in that it can be used only under a basic condition (as it decomposes under a neutral to acidic condition).

For removing hydrogen sulfide from hydrocarbon, using an aldehyde compound has also been proposed thorough the ages. Specifically, PTL 1 discloses reaction of an aldehyde compound and hydrogen sulfide, especially reaction of an aqueous formaldehyde solution and hydrogen sulfide in an aqueous solution having a pH range of 2 to 12. Following this, a large number of reports have been made relating to use of an aldehyde compound for removing hydrogen sulfide. For example, PTL 2 uses an aqueous solution of a water-soluble aldehyde such as formaldehyde, glyoxal or glutaraldehyde as an agent for removing hydrogen sulfide from hydrocarbon.

Merely adding a hydrogen sulfide remover in the form of an aqueous solution to hydrocarbon requires further improvement from the viewpoint of mixing them, and for example, PTL 3 says that, by adding an emulsifying agent such as sorbitan sesquioleate to the above aldehydes, the hydrogen removal efficiency can be improved. In PTL 4, for efficiently removing hydrogen sulfide from heavy oil, a hydrogen sulfide remover in the form of an aqueous solution and heavy oil are emulsified in an injection system equipped with a static mixer. In addition, there are known other examples of adding a polyalkylene glycol to a system for more increasing efficiency (PTLs 5 and 6).

In the case where the above-mentioned water-soluble aldehyde in the form of an aqueous solution thereof is used as a hydrogen sulfide remover, there is a risk of metal corrosion in the apparatus to be caused by the presence of an organic carboxylic acid in the aqueous solution as a result of oxidation of formaldehyde, glyoxal or glutaraldehyde. In particular, an aqueous solution of glyoxal has a strong metal corrosive property. From this viewpoint, PTL 7 and PTL 8 propose co-use of a phosphate salt such as $LiH_2PO_4$, $NaH_2PO_4$, $Na_2HPO_4$, $KH_2PO_4$, $K_2HPO_4$ or the like, a phosphate ester, a thiophosphate, a thioamine or the like as a corrosion inhibitor.

However, it is well known that formaldehyde is a mutagenic substance, and glutaraldehyde undergoes self-polymerization at a high concentration and therefore can be used only in a diluted state, and is therefore problematic from the viewpoint of volume efficiency.

On the other hand, PTL 2 discloses use of not only the above-mentioned water-soluble aldehyde but also acrolein having a higher organismic degree as a hydrogen sulfide remover, and in SPE Annual Technical Conference and Exhibition SPE146080 held in Denver, Colo. USA in Oct. 30 to Nov. 2, 2011, a report relating to hydrogen sulfide removal using acrolein as an active ingredient was announced. However, acrolein is a highly toxic compound and is therefore problematic in that the concentration thereof is strictly regulated from work safety and environment safety and that the compound requires careful handling.

CITATION LIST

Patent Literature

PTL 1: U.S. Pat. No. 1,991,765
PTL 2: U.S. Pat. No. 4,680,127
PTL 3: U.S. Pat. No. 5,284,635
PTL 4: WO2011/087540
PTL 5: JP 2012-525964 A
PTL 6: JP 2013-544305 A
PTL 7: US 2013/090271 A
PTL 8: US 2013/089460 A

Non-Patent Literature

NPL 1: SPE Annual Technical Conference and Exhibition SPE146080, 2011; http://dx.doi.org/10.2118/146080-MS

SUMMARY OF INVENTION

Technical Problem

As described above, in using an aqueous solution of a water-soluble aldehyde that has heretofore proposed as a remover for hydrogen sulfide contained in hydrocarbon or hydrocarbon flow, it must be dispersed in hydrocarbon by any means or metal corrosion in devices to be caused by the aqueous solution itself must be prevented, and therefore further improvement is desired.

Given the situation, an object of the present invention is to provide a composition capable of safely and efficiently removing sulfur-containing compounds, especially hydrogen sulfide, —SH group-containing compounds or mixtures thereof contained in hydrogen sulfide, without causing metal corrosion in devices.

Solution to Problem

The present invention is as follows.

[1] A composition for removing a sulfur-containing compound in a hydrocarbon, the sulfur-containing compound being hydrogen sulfide, an —SH group-containing compound or a mixture thereof,
the composition containing a dialdehyde having 6 to 16 carbon atoms and a polyalkylene glycol.
[2] The composition according to [1], wherein the dialdehyde is at least one selected from the group consisting of 3-methylglutaraldehyde, 1,9-nonanedial and 2-methyl-1,8-octanedial.
[3] The composition according to [1] or [2], wherein the polyalkylene glycol is at least one selected from the group consisting of polyethylene glycol, polypropylene glycol and polybutylene glycol.
[4] The composition according to any of [1] to [3], wherein the targeted hydrocarbon from which the sulfur-containing compound is to be removed is at least one selected from the group consisting of natural gas, liquefied natural gas, sour gas, crude oil, naphtha, heavy aromatic naphtha, gasoline, kerosene, diesel oil, gas oil, heavy oil, FCC slurry, asphalt and oilfield condensate.
[5] A method for removing a sulfur-containing compound in a hydrocarbon, wherein includes bringing the hydrocarbon in contact with the composition of any of [1] to [4] to remove the sulfur-containing compound in the hydrocarbon, the sulfur-containing compound being hydrogen sulfide, an —SH group-containing compound or a mixture thereof.
[6] The method according to [5], wherein the hydrocarbon is at least one selected from the group consisting of natural gas, liquefied natural gas, sour gas, crude oil, naphtha, heavy aromatic naphtha, gasoline, kerosene, diesel oil, gas oil, heavy oil, FCC slurry, asphalt and oilfield condensate.
[7] The method according to [5] or [6], wherein the dialdehyde contained in the composition of any of [1] to [4] is added in an amount of 0.1 to 100 mol relative to 1 mol of the sulfur-containing compound contained in the hydrocarbon.
[8] The method according to any of [5] to [7], wherein includes bringing the hydrocarbon in contact with the composition of any of [1] to [4] in a range of 0° C. to 200° C.
[9] Use of the composition of any of [1] to [4], for removing a sulfur-containing compound of hydrogen sulfide, an —SH group-containing compound or a mixture thereof in a hydrocarbon.

Advantageous Effects of Invention

The composition of the present invention contains a dialdehyde having 6 to 16 carbon atoms, for example, 1,9-nonanedial and/or 2-methyl-1,8-octanedial and a polyalkylene glycol, and is therefore excellent in the ability to remove a sulfur-containing compound, especially hydrogen sulfide, an —SH group-containing compound or a mixture thereof in a hydrocarbon. As compared with a conventional hydrogen sulfide remover that contains glutaraldehyde or glyoxal, the composition of the present invention is poorly metal-corrosive in devices, and is industrially advantageous.

BRIEF DESCRIPTION OF DRAWING

FIG. 1 is a graph drawn by plotting the $H_2S$ concentration relative to time in the off-gas in Example 1 and 2 and Comparative Examples 1 to 4.

DESCRIPTION OF EMBODIMENTS

In this description, the targeted hydrocarbon to which the composition of the present invention is applicable may be a gaseous, liquid or solid one or in a mixed state thereof, and typically includes, though not limited thereto, fossil fuel, purified petroleum products and the like such as natural gas, liquefied natural gas, sour gas, crude oil, naphtha, heavy aromatic naphtha, gasoline, kerosene, diesel oil, gas oil, heavy oil, FCC slurry, asphalt, oilfield condensate and others as well as any arbitrary combinations thereof.

In the present invention, the sulfur-containing compound to be contained in the targeted hydrocarbon and to be removed by the use of the composition of the present invention includes hydrogen sulfide, an —SH group-containing compound or a mixture thereof. Here, the —SH group-containing compound includes, though not limited thereto, sulfur-containing compounds as classified in mercaptans represented by a chemical formula "R—SH", for example, those where R is an alkyl group, such as methylmercaptan, ethylmercaptan, propylmercaptan, isopropylmercaptan, n-butylmercaptan, isobutylmercaptan, sec-butylmercaptan, tert-butylmercaptan, n-amylmercaptan; those where R is an aryl group, such as phenylmercaptan; those where R is an aralkyl group, such as benzylmercaptan; etc.

The composition of the present invention is characterized by containing a dialdehyde having 6 to 16 carbon atoms.

The dialdehyde reacts with the sulfur-containing compound in hydrocarbon in a mode of addition reaction, whereby the sulfur-containing compound is removed from hydrocarbon.

In the case where the sulfur-containing compound is an —SH group-containing compound, the —SH group reacts with the formyl group (R'—CH=O) in the dialdehyde in a mode of addition reaction so that the compound is converted into a thioacetal (R'—CH(OH)SR) or a dithioacetal (R'—CH(SR)$_2$) and the —SH group is thereby removed.

On the other hand, in the case where the sulfur-containing compound is hydrogen sulfide, hydrogen sulfide reacts with the formyl group (R'—CH=O) in the dialdehyde in a mode of addition reaction so that the compound is converted into an —SH group-having compound such as R'—CH(OH)SH or R'—CH(SH)$_2$. Subsequently, the —SH group is removed according to the same reaction mechanism as mentioned above.

The dialdehyde having 6 to 16 carbon atoms is preferably an aliphatic dialdehyde, and examples thereof include methylglutaraldehyde, 1,6-hexanedial, ethylpentanedial, 1,7-heptanedial, methylhexanedial, 1,8-octanedial, methylheptanedial, dimethylhexanedial, ethylhexanedial, 1,9-nonanedial, methyloctanedial, ethylheptanedial, 1,10-decanedial, dimethyloctanedial, ethyloctanedial, dodecanedial, hexadecanedial, 1,2-cyclohexanedicarboaldehyde, 1,3-cyclohexanedicarboaldehyde, 1,4-cyclohexanedicarboaldehyde, 1,2-cyclooctanedicarboaldehyde, 1,3- cyclooctanedicarboaldehyde, 1,4-cyclooctanedicarboaldehyde, 1,5-cyclooctanedicarboaldehyde, etc. Among these, at least one selected from a group consisting of 3-methylglutaraldehyde, 1,9-nonanedial and 2-methyl-1,8-octanedial is preferred, and from the viewpoint of low toxicity, biodegradability, safety in handling, heat resistance and the like, it is more preferred to contain at least one of 1,9-nonanedial and 2-methyl-1,8-octanedial.

In the case where the composition of the present invention contains at least one of 1,9-nonanedial and 2-methyl-1,8-octanedial, the active ingredient may be 1,9-nonanedial alone or 2-methyl-1,8-octanedial alone, but from the viewpoint of industrial easy availability, a mixture of 1,9-nonanedial and 2-methyl-1,8-octanedial is especially preferred. In the mixture of 1,9-nonanedial and 2-methyl-1,8-octanedial, the mixing ratio is not specifically limited but in general, the ratio by mass of 1,9-nonanedial/2-methyl-1,8-octanedial is preferably 99/1 to 1/99, more preferably 95/5 to 5/95, even more preferably 90/10 to 45/55, especially preferably 90/10 to 55/45.

3-Methylglutaraldehyde, 1,9-nonanedial and 2-methyl-1,8-octanedial are all known substances, and can be produced according to known methods (for example, for 3-methylglutaraldehyde, the methods described in Organic Syntheses, Vol. 34, p. 29 (1954), and Organic Syntheses, Vol. 34, p. 71 (1954), etc.; and for 1,9-nonanedial and 2-methyl-1,8-octanedial, the methods described in Japanese Patent 2857055, JP-B 62-61577, etc.), or according to methods similar to the known methods. Commercial products of the compounds can be used.

The composition of the present invention is characterized by further containing a polyalkylene glycol in addition to the above-mentioned dialdehyde having 6 to 16 carbon atoms. Examples of the polyalkylene glycol include polyethylene glycol, polypropylene glycol, polybutylene glycol, polyoxetane, polytetramethylene ether glycol, etc. Among these, polyethylene glycol, polypropylene glycol and polybutylene glycol are preferred from the viewpoint of the cost and the affinity thereof with dialdehyde. One alone or two or more kinds of these may be used either singly or as combined.

The number-average molecular weight of the polyalkylene glycol to be used is not specifically limited but is generally 100 to 20,000, preferably 100 to 4,000, more preferably 150 to 600. When the number-average molecular weight is more than 20,000, the viscosity increases and the flowability lowers so that the load to device increases. When less than 100, the concentration of the hydroxyl group increases and therefore any unexpected reaction with dialdehyde may be caused.

For the polyalkylene glycol, commercial products may be used, or the compound may be produced according to a known method of, for example, ring-opening polymerization of alkylene oxide.

The total content of the dialdehyde and the polyalkylene glycol in the composition of the present invention may be adequately defined depending on the use mode of the composition, but is generally 1 to 100% by mass, and is, from the viewpoint of cost to performance, preferably 5 to 100% by mass, more preferably 5 to 95% by mass.

The content ratio of the dialdehyde to the polyalkylene glycol in the composition of the present invention is generally A/B=0.1/99.9 to 99.9/0.1 where the content of the dialdehyde is referred to as A (part by mass) and that of the polyalkylene glycol is as B (part by mass), and from the viewpoint of cost to performance, the ratio is preferably A/B=20/80 to 99.9/0.1.

The production method for the composition of the present invention is not specifically limited, and the composition may be produced in any per-se known method or according to a method similar thereto. For example, a polyalkylene glycol and other optional components to be mentioned below are added to a dialdehyde, preferably at least one selected from methylglutaraldehyde, 1,9-nonanedial and 2-methyl-1,8-octanedial, more preferably a mixture of 1,9-nonanedial and 2-methyl-1,8-octanedial, and mixed to produce the composition.

The composition of the present invention is preferably liquid, but in accordance with the type of usage thereof for removing a sulfur-containing compound in hydrocarbon, the composition may be in a solid form of powder, granules or the like held on an adequate carrier or the like.

Regarding the method of removing a sulfur-containing compound from hydrocarbon using the composition of the present invention, an aldehyde compound heretofore known as a hydrogen sulfide remover, such as formaldehyde, glyoxal, glutaraldehyde, acrolein or the like may be adequately added to the composition of the present invention within a range not detracting from the advantageous effects of the present invention.

In the method of removing a sulfur-containing compound from hydrocarbon using the composition of the present invention, a nitrogen-containing compound may be further added within a range capable of furthermore increasing the advantageous effects of the present invention or not detracting from the effects. Examples of the nitrogen-containing compound of the type include α-amioether compounds such as N,N'-oxybis(methylene)bis(N,N-dibutylamine), N,N'-(methylenebis(oxy)bis(methylene))bis(N,N-dibutylamine), 4,4'-oxybis(methylene)dimorpholine, bis(morpholinomethoxy)methane, 1,1'-oxybis(methylene)dipiperidine, bis(piperidinomethoxy)methane, N,N'-oxybis(methylene)bis(N,N-dipropylamine), N,N'-(methylenebis(oxy)bis(methylene))bis(N,N-dipropylamine), 1,1'-oxybis(methylene)dipyrrolidine, bis(pyrrolidinomethoxy)methane, N,N'-oxybis(methylene)bis(N,N-diethylamine), N,N'-(methylenebis(oxy)bis(methylene))bis(N,N-diethylamine), etc.; alkoxy-hexahydrotriazine compounds such as 2,3,5-trimethoxypropyl-hexahydro-1,3,5-triazine, 1,3,5-trimethoxyethyl-hexahydro-1,3,5-triazine, 1,3,5-tri(3-ethoxypropyl)-hexahydro-1,3,5-triazine, 1,3,5-tri(3-isopropoxypropyl)-hexahydro-1,3,5-triazine, 1,3,5-tri(3-butoxypropyl)-hexahydro-1,3,5-triazine, 1,3,5-tri(5-methoxypentyl)-hexahydro-1,3,5-triazine, etc.; alkyl-hexahydrotriazine compounds such as 1,3,5-trimethyl-hexahydro-1,3,5-triazine, 1,3,5-triethyl-hexahydro-1,3,5-triazine, 1,3,5-tripropyl-hexahydro-1,3,5-triazine, 1,3,5-tributyl-hexahydro-1,3,5-triazine, etc.; hydroxyalkyl-hexahydrotriazine compounds such as 1,3,5-tri(hydroxymethyl)-hexahydro-1,3,5-triazine, 1,3,5-tri(2-hydroxyethyl)-hexahydro-1,3,5-triazine, 1,3,5-tri(3-hydroxypropyl)-hexahydro-1,3,5-triazine, etc.; monoamine compounds such as monomethylamine, monoethylamine, dimethylamine, dipropylamine, trimethylamine, triethylamine, tripropylamine, monomethanolamine, dimethanolamine, trimethanolamoine, diethanolamine, triethanolamine, monoisopropanolamine, dipropanolamine, diisopropanolamine, tripropanolamine, N-methylethanolamine, dimethyl(ethanol)amine, methyldiethanolamine, dimethylaminoethanol, ethoxyethoxyethanol-tert-butylamine, etc.; diamine Compounds such as aminomethylcyclopentylamine, 1,2-cyclohexanediamine, 1,4-butanediamine, 1,5-pentanediamine, 1,6-hexanediamine, bis(tert-butylaminoethoxy)ethane, etc.; imine compounds; imidazoline compounds; hydroxyaminoalkyl ether compounds; morpholine compounds; pyrrolidone compounds; piperidone compounds; alkylpyridine compounds; 1H-hexahydroazepines; reaction products of alkylenepolyamine and formaldehyde such as reaction products of ethylenediamine and formaldehyde, etc.; polyvalent metal chelate compounds of aminocarboxylic acids; quaternary ammonium salt compounds such as benzyl(cocoalkyl)(dimethyl) quaternary ammonium chlorides, di(cocoalkyl)dimethylammonium chlorides, di(tallow-alkyl)dimethyl quaternary ammonium chlorides, di(hydrogenated tallow-alkyl)dimethyl quaternary ammonium chlorides, dimethyl(2-ethylhexyl)(tallow-alkyl)ammonium methyl sulfates, (hydrogenated tallow-alkyl)(2-ethylhexyl)dimethyl quaternary ammonium methyl sulfate, etc.; polyethyleneimines, polyallylamines, polyvinylamines; aminocarbinol compounds; aminal compounds; bisoxazolidine compound; etc. One alone or two or more kinds of these may be used either singly or as combined.

In one preferred embodiment of the present invention, the composition of the present invention is added to a hydrocarbon in an amount sufficient for removing a sulfur-containing compound (hydrogen sulfide, an —SH group-containing compound, or a mixture thereof), or a gaseous hydrocarbon containing such a sulfur-containing compound is led to pass through a container filled with a liquid of the composition of the present invention to treat the hydrocarbon. In the method of removing a sulfur-containing compound in a hydrocarbon using the composition of the present invention, the composition is so added that the amount of the dialdehyde contained in the composition of the present invention is generally 0.1 to 100 mol relative to 1 mol of the sulfur-containing compound in the hydrocarbon, preferably 1 to 100 mol. In the method where a hydrocarbon is led to pass through a container filled with a liquid of the composition of the present invention, the amount of the composition of the present invention to be added is so controlled that the amount of the dialdehyde to be added falls within the above-mentioned range relative to 1 mol of the sulfur-containing compound in the hydrocarbon to be applied to the container. The temperature at which the composition of the present invention is added to hydrocarbon to treat it is generally within a range of 0° C. to 200° C., preferably 20° C. to 120° C. Before use, the composition of the present invention may be dissolved in an adequate solvent, for example, cyclohexane, toluene, xylene, heavy aromatic naphtha, or petroleum distillate; or a monoalcohol or diol having 1 to 10 carbon atoms such as methanol, ethanol, ethylene glycol or the like.

In the method of removing a sulfur-containing compound in hydrocarbon using the composition of the present invention, where the hydrocarbon is liquid, the composition may be added in any known method of injecting it into a reservoir tank thereof, or in a pipeline for transportation thereof, or into a distillation column for purification. Where the hydrocarbon is vapor, the composition of the present invention may be arranged as to be kept in contact with the vapor, or the vapor may be led to pass through an absorption column filled with the composition of the present invention.

EXAMPLES

Hereinunder, the present invention is described in more detail with reference to Examples, but the present invention is not limited to these Examples.

Production Example 1

[Production of Mixture of 1,9-Nonanedial (NL) and 2-Methyl-1,8-Octanedial (MOL)]

According to the method described in Japanese Patent 2857055, a mixture of 1,9-nonanedial (hereinafter referred to as NL) and 2-methyl-1,8-octanedial (hereinafter referred to as MOL) was produced. The ratio by mass of NL to MOL in the mixture was NL/MOL=85/15.

Example 1

20 mL of PEG-200 (manufactured by Wako Pure Chemical Industries, Ltd.) was put into a 100-mL autoclave equipped with a thermometer and a stirrer, and with stirring at 800 rpm, the temperature thereof was controlled to be 25° C., and an $H_2S$ standard gas controlled at 10,000 ppm was introduced thereinto at a rate of 16 mL/min. After the inside of the device was fully purged, the gauge pressure was controlled at 0.1 MPa, and measurement of the $H_2S$ concentration in the off-gas using RX-517 (manufactured by RIKEN KIKI Co., Ltd.) was started, and immediately, 20 mL of a composition liquid prepared by mixing PEG-200 and NL/MOL in a ratio by mass of 1/1 was added to the autoclave, taking 4 minutes. At this time, the amount of NL/MOL added was 64.0 mmol. After the addition, the gas flow was continued for 2 hours resulting in that the total flow amount of $H_2S$ was 0.8 mmol, and the total reaction amount of $H_2S$ as calculated from the $H_2S$ concentration in the off-gas was 0.8 mmol.

Comparative Example 1

The reaction was carried out under the same condition as in Example 1 except that PEG-200 was changed to toluene (manufactured by Wako Pure Chemical Industries, Ltd.), and the amount of NL/MOL added was 57.4 mmol. The total flow amount of $H_2S$ was 0.8 mmol, and the total reaction amount of $H_2S$ as calculated from the $H_2S$ concentration in the off-gas was 0.3 mmol.

Example 2

The reaction was carried out under the same condition as in Example 1 except that PEG-200 was changed to a mixture of toluene/PEG-200=99/1 (ratio by mass), and the amount of NL/MOL added was 57.4 mmol. The total flow amount of $H_2S$ was 0.8 mmol, and the total reaction amount of $H_2S$ as calculated from the $H_2S$ concentration in the off-gas was 0.5 mmol.

Comparative Example 2

The reaction was carried out under the same condition as in Example 1 except that PEG-200 was changed to isopropanol (IPA, manufactured by Wako Pure Chemical Industries, Ltd.), and the amount of NL/MOL added was 54.9 mmol. The total flow amount of $H_2S$ was 0.8 mmol, and the total reaction amount of $H_2S$ as calculated from the $H_2S$ concentration in the off-gas was 0.4 mmol.

Comparative Example 3

The reaction was carried out under the same condition as in Example 1 except that PEG-200 was changed to ethyl acetate (AcOEt, manufactured by Wako Pure Chemical Industries, Ltd.), and the amount of NL/MOL added was 58.9 mmol. The total flow amount of $H_2S$ was 0.8 mmol, and the total reaction amount of $H_2S$ as calculated from the $H_2S$ concentration in the off-gas was 0.3 mmol.

Comparative Example 4

The reaction was carried out under the same condition as in Example 1 except that the mixture of PEG-200 and NL/MOL was changed to PEG-200 alone, and the total flow amount of $H_2S$ was 0.8 mmol, and the amount of $H_2S$ dissolved in PEG-200, as calculated from the $H_2S$ concentration in the off-gas, was 0.1 mmol.

The data of the $H_2S$ concentration in the off-gas relative to time, in Examples 1 and 2 and Comparative Examples 1 to 4, are plotted in FIG. 1. In FIG. 1, the time at which addition of the composition of the present invention was ended is 0 min.

Example 3

30 ml of a crude oil from the Yurihara oil and gas field (produced by Japan Petroleum Exploration Co., Ltd.) was put into a 100-mL autoclave equipped with a thermometer and a stirrer, and stirred until the $H_2S$ concentration in the vapor phase became constant, and then using RX-517 (manufactured by RIKEN KIKI Co., Ltd.), the concentration was measured and was 2,800 ppm. Next, a composition liquid prepared by mixing PEG-200 and NL/MOL in a ratio by mass of 1/1 was added to be 1% by mass relative to the crude oil. At this time, the amount of NL/MOL added was 1.0 mmol, and the amount of $H_2S$ existing inside the device was 0.05 mmol. Subsequently, the inside of the device was heated up to 80° C. with stirring at 800 rpm, and the reaction was continued for 5 hours. After the reaction, the system was cooled to room temperature, and the $H_2S$ concentration in the vapor phase was measured and was 2 ppm, that is, the removal efficiency was 99.9%.

Comparative Example 5

30 ml of a crude oil from the Yurihara oil and gas field (produced by Japan Petroleum Exploration Co., Ltd.) was put into a 100-mL autoclave equipped with a thermometer and a stirrer, and stirred until the $H_2S$ concentration in the vapor phase became constant, and then using RX-517 (manufactured by RIKEN KIKI Co., Ltd.), the concentration was measured and was 2,600 ppm. Next, an aqueous 40 mass % glyoxal solution (manufactured by Wako Pure Chemical Industries, Ltd.) was added to be 1% by mass relative to the crude oil. At this time, the amount of glyoxal added was 1.8 mmol, and the amount of $H_2S$ existing inside the device was 0.04 mmol. Subsequently, the inside of the device was heated up to 80° C. with stirring at 800 rpm, and the reaction was continued for 5 hours. After the reaction, the system was cooled to room temperature, and the $H_2S$ concentration in the vapor phase was measured and was 498 ppm, that is, the removal efficiency was 80.8%.

Test Example 1

For evaluating the metal corrosive property of an aqueous aldehyde solution, the following aqueous solutions were prepared.
A. Aqueous 1% NL/MOL solution: prepared by diluting a mixture of NL/MOL with distilled water.
B. Aqueous 1% glutaraldehyde solution: prepared by diluting an aqueous 50% glutaraldehyde solution (manufactured by Wako Pure Chemical Industries, Ltd.) with distilled water.
C. Aqueous 1% glyoxal solution: prepared by diluting an aqueous 40% glyoxal solution (manufactured by Tokyo Chemical Industry Co., Ltd.) with distilled water.
D. Distilled water (blank)

A test piece of SS400 (20 mm×20 mm×2 mm) and any 25 g of any of the above-mentioned aqueous aldehyde solutions A to D were put into each of four, 50-ml screw tubes in air, and sealed up, and stored in a circulation-type drier set at 85° C. for 9 days. After the storage, the test piece was taken out and the iron ion concentration in the aqueous solution was measured in atomic absorptiometry. The results are shown in Table 1.

Test Example 2

The same process as in Test Example 1 was carried out except that the tube was sealed up in nitrogen, and the iron ion concentration in each aqueous solution was measured. The results are shown in Table 1.

TABLE 1

| Results of Corrosion Test | | |
|---|---|---|
| | Iron Ion Concentration (ppm) | |
| Aqueous Aldehyde Solution | Test Example 1 | Test Example 2 |
| A (1%-NL/MOL) | 516 | 17 |
| B (1%-glutaraldehyde) | 2079 | 449 |
| C (1%-glyoxal) | 3273 | 2450 |
| D (blank) | 471 | 31 |

From the results of Test Example 1 and Test Example 2, it is known that the aqueous NL/MOL solution can prevent iron corrosion more than the aqueous glutaraldehyde solution or the aqueous glyoxal solution.

The invention claimed is:
1. A composition, comprising:
a dialdehyde having 6 to 16 carbon atoms and a polyalkylene glycol,
wherein the composition is suitable for removing a sulfur-containing compound in a hydrocarbon, and
the sulfur-containing compound is hydrogen sulfide, an —SH group-containing compound or a mixture thereof.
2. The composition according to claim 1, wherein the dialdehyde is at least one selected from the group consisting of 3-methylglutaraldehyde, 1,9-nonanedial and 2-methyl-1,8-octanedial.
3. The composition according to claim 1, wherein the polyalkylene glycol is at least one selected from the group consisting of polyethylene glycol, polypropylene glycol and polybutylene glycol.
4. The composition according to claim 1, wherein the hydrocarbon is at least one selected from the group consisting of natural gas, liquefied natural gas, sour gas, crude oil, naphtha, heavy aromatic naphtha, gasoline, kerosene, diesel oil, gas oil, heavy oil, FCC slurry, asphalt and oilfield condensate.
5. A method for removing a sulfur-containing compound in a hydrocarbon, the method comprising:
bringing the hydrocarbon in contact with the composition of claim 1 to remove the sulfur-containing compound in the hydrocarbon.
6. The method according to claim 5, wherein the hydrocarbon is at least one selected from the group consisting of natural gas, liquefied natural gas, sour gas, crude oil, naph- tha, heavy aromatic naphtha, gasoline, kerosene, diesel oil, gas oil, heavy oil, FCC slurry, asphalt and oilfield condensate.

7. The method according to claim 5, wherein the dialdehyde contained in the composition is added in an amount of 0.1 to 100 mol relative to 1 mol of the sulfur-containing compound contained in the hydrocarbon.

8. The method according to claim 5, the method comprising:
bringing the hydrocarbon in contact with the composition at a temperature in a range of 0° C. to 200° C.

9. A hydrocarbon, obtained by a process comprising removing a sulfur-containing compound of hydrogen sulfide, an —SH group-containing compound or a mixture thereof in the hydrocarbon with the composition of claim 1.

10. The composition according to claim 1, wherein the di aldehyde is an aliphatic di aldehyde.

11. The composition according to claim 1, wherein the dialdehyde is 3-methylglutaraldehyde.

12. The composition according to claim 1, wherein the dialdehyde is 1,9-nonanedial.

13. The composition according to claim 1, wherein the dialdehyde is 2-methyl-1,8-octanedial.

\* \* \* \* \*